(12) United States Patent
Cho et al.

(10) Patent No.: US 10,001,416 B2
(45) Date of Patent: Jun. 19, 2018

(54) TEMPERATURE SENSOR HAVING CALIBRATION FUNCTION ACCORDING TO TEMPERATURE, METHOD OF OPERATING THE SAME, AND DEVICES INCLUDING THE SAME

(71) Applicant: SAMSUNG ELECTRONICS CO., LTD., Suwon-si (KR)

(72) Inventors: Sang Hyun Cho, Asan-si (KR); Myoung Oh Ki, Seoul (KR); Joo Sung Lee, Seoul (KR); Hyoung Jong Ko, Seongnam-si (KR); Sang Ho Kim, Suwon-si (KR); Ho Jin Park, Suwon-si (KR); Seoung Jae Yoo, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 727 days.

(21) Appl. No.: 14/475,154

(22) Filed: Sep. 2, 2014

(65) Prior Publication Data
US 2015/0063403 A1    Mar. 5, 2015

(30) Foreign Application Priority Data
Sep. 2, 2013    (KR) ........................ 10-2013-0105071

(51) Int. Cl.
*G01K 15/00*    (2006.01)
*G01K 19/00*    (2006.01)
*G01K 1/02*    (2006.01)

(52) U.S. Cl.
CPC ........... *G01K 15/005* (2013.01); *G01K 1/028* (2013.01)

(58) Field of Classification Search
None
See application file for complete search history.

(56) References Cited

U.S. PATENT DOCUMENTS 6,183,131 B1 *    2/2001    Holloway ................ G01K 7/21
                                            327/512
6,591,210 B1    7/2003    Lorenz
(Continued)

FOREIGN PATENT DOCUMENTS

JP    2009-8625 A    1/2009
JP    2009-175032 A    8/2009

*Primary Examiner* — Erica Lin
(74) *Attorney, Agent, or Firm* — Sughrue Mion, PLLC

(57) ABSTRACT

A temperature sensor having calibration function according to temperature, a method of operating the same, and a device including the same are provided. The temperature sensor includes a reference circuit configured to generate at least one temperature information signal that varies according to a temperature, and generate at least one reference signal that is substantially constant relative to the temperature; and a digital temperature generator configured to receive the at least one temperature information signal and the at least one reference signal generated by the reference circuit, and generate a digital temperature information signal indicative of the temperature based on the at least one temperature information signal and the at least one reference signal, wherein one of the reference circuit and the digital temperature generator is configured to receive a calibration signal and adjust the at least one reference signal based on the calibration signal.

18 Claims, 20 Drawing Sheets

(56) References Cited

U.S. PATENT DOCUMENTS

| | | |
|---|---|---|
| 7,891,868 B2 | 2/2011 | Sohn |
| 8,022,780 B2 | 9/2011 | Taghivand et al. |
| 8,218,375 B2 | 7/2012 | Joo et al. |
| 8,321,169 B2 | 11/2012 | Brooks et al. |
| 2006/0276986 A1* | 12/2006 | Anderson ........ G01R 31/31703 702/99 |
| 2008/0018482 A1 | 1/2008 | Chiu et al. |
| 2008/0317097 A1* | 12/2008 | Sohn ........................ G11C 7/04 374/172 |
| 2011/0184686 A1 | 7/2011 | Brooks et al. |
| 2012/0139617 A1* | 6/2012 | Gerna ..................... G05F 3/245 327/513 |
| 2012/0307866 A1 | 12/2012 | Chen |
| 2013/0034121 A1* | 2/2013 | Lee ........................ G01K 13/00 374/152 |

\* cited by examiner

TEMPERATURE SENSOR HAVING CALIBRATION FUNCTION ACCORDING TO TEMPERATURE, METHOD OF OPERATING THE SAME, AND DEVICES INCLUDING THE SAME

CROSS-REFERENCE TO RELATED APPLICATIONS

This application claims priority from Korean Patent Application No. 10-2013-0105071 filed on Sep. 2, 2013, the disclosure of which is hereby incorporated by reference in its entirety.

BACKGROUND

Apparatuses and methods consistent with exemplary embodiments relate to a temperature sensor, and more particularly, to a temperature sensor capable of calibrating a sensed temperature according to the temperature, devices including the same, and a method of operating the same.

As current and heat per unit area increases with the development of micro-fabrication processes, a temperature management system that allows mobile equipment to operate stably without experiencing thermal runaway is essential. Accordingly, interest in and study on a temperature sensor, which is an essential circuit of the temperature management system, has increased.

Since a temperature sensor is usually implemented using a semiconductor device (such as a transistor), it is affected by processes. In addition, the accuracy of sensed temperature may vary depending on the temperature. For instance, the accuracy of the temperature sensor may be decreased at high temperature. Therefore, it is desired to reduce the influence of processes and to perform correction according to temperature in order to increase the accuracy of the temperature sensor.

SUMMARY

One or more exemplary embodiments provide a temperature sensor for increasing the accuracy of sensed temperature by calibrating the sensed temperature according to the temperature and devices including the same.

According to an aspect of an exemplary embodiment, there is provided a temperature sensor including: a reference circuit configured to generate at least one temperature information signal that varies according to a temperature, and generate at least one reference signal that is substantially constant relative to the temperature; and a digital temperature generator configured to receive the at least one temperature information signal and the at least one reference signal generated by the reference circuit, and generate a digital temperature information signal indicative of the temperature based on the at least one temperature information signal and the at least one reference signal, wherein one of the reference circuit and the digital temperature generator is configured to receive a calibration signal and adjust the at least one reference signal based on the calibration signal.

According to an aspect of another exemplary embodiment, there is provided a system on chip including: a processor; and a temperature sensor disposed inside or outside the processor, the temperature sensor including: a reference circuit configured to generate first and second temperature information signals that vary according to a temperature, and generate first and second reference signals that are substantially constant relative to the temperature; and a digital temperature generator configured to receive the first and second temperature information signals and the first and second reference signals generated by the reference circuit, and generate a digital temperature information signal indicative of the temperature based on the first and second temperature information signals and the first and second reference signals, wherein one of the reference circuit and the digital temperature generator is configured to receive a calibration signal and adjust at least one of the first and second reference signals based on the calibration signal.

According to an aspect of another exemplary embodiment, there is provided an electronic system including: a power source configured to supply an operating voltage; a storage device configured to store data; a memory configured to store data and programs; input/output (I/O) ports configured to receive data transmitted to the electronic system or transmit data from the electronic system; a network device configured to communicably connect with a wired or wireless network; a display configured to display data output from at least one of the storage device, the memory, the I/O ports, and the network device; and a system on chip comprising a processor and a temperature sensor disposed inside or outside the processor, the temperature sensor including: a reference circuit configured to generate first and second temperature information signals that vary according to a temperature, and generate first and second reference signals that are substantially constant relative to the temperature; and a digital temperature generator configured to receive the first and second temperature information signals and the first and second reference signals generated by the reference circuit, and generate a digital temperature information signal indicative of the temperature based on the first and second temperature information signals and the first and second reference signals, wherein one of the reference circuit and the digital temperature generator is configured to receive a calibration signal and adjust at least one of the first and second reference signals based on the calibration signal.

According to an aspect of another exemplary embodiment, there is provided a method of operating a temperature sensor, the method including: generating, by the temperature sensor, at least one temperature information signal that varies according to a temperature; generating, by the temperature sensor, at least one reference signal that is substantially constant relative to the temperature, wherein at least one reference signal is adjusted based on a calibration signal; and generating, by the temperature sensor, a digital temperature information signal indicative of the temperature based on the at least temperature information signal and the at least one reference signal.

BRIEF DESCRIPTION OF THE DRAWINGS

The above and/or other aspects will become more apparent by describing in detail exemplary embodiments with reference to the attached drawings in which.

DETAILED DESCRIPTION

Figure 1:
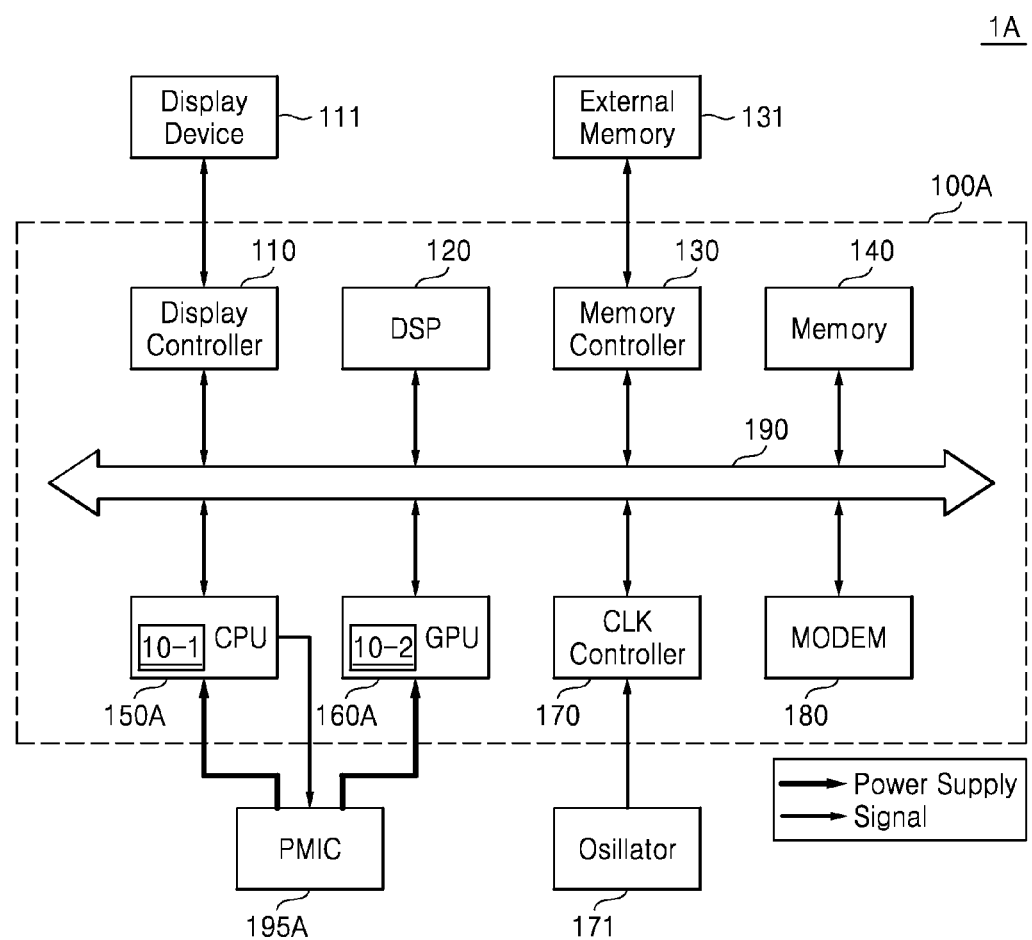
FIG. 1 is a block diagram of a semiconductor system including a system on chip (SoC) according to an exemplary embodiment.

Exemplary embodiments now will be described in detail with reference to the accompanying drawings. The inventive concept may, however, be embodied in many different forms and should not be construed as limited to the embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a semiconductor system 1 including a system on chip (SoC) 100A according to an exemplary embodiment. The semiconductor system 1 may be implemented, for example, as a handheld device such as a mobile telephone, a smart phone, a tablet computer, a personal digital assistant (PDA), an enterprise digital assistant (EDA), a digital still camera, a digital video camera, a portable multimedia player (PMP), a personal navigation device or portable navigation device (PND), a handheld game console, or an e-book. However, embodiments of the inventive concept are not limited to these exemplary handheld devices or to a handheld device.

In addition to the SoC 100A, the semiconductor system 1 may include a display device 111, an external memory 131, an oscillator 171, and a power management integrated circuit (PMIC) 195. The SoC 100A may be an application processor. The application processor may control overall operations of the semiconductor system 1.

The SoC 100A may include a display controller 110, a digital signal processor (DSP) 120, a memory controller 130, an internal memory 140, a central processing unit (CPU) 150A, a graphics processing unit (GPU) 160A, a clock controller 170, a modem 180, and a bus 190. The SoC 100A may also include other elements, e.g., an accelerator, a television (TV) processor, and an interface circuit.

The CPU 150A may execute programs and/or process data stored in the external memory 131 or the internal memory 140. For instance, the CPU 150A may execute the programs and/or process the data in response to an operating clock signal output from the clock controller 170.

The CPU 150A may be implemented by a multi-core processor. The multi-core processor is a single computing component with two or more independent actual processors (referred to as "cores"). Each of the processors may read and execute program instructions. The multi-core processor can drive a plurality of accelerators at a time, and therefore, a data processing system including the multi-core processor may perform multi-acceleration.

The CPU 150A includes a temperature sensor 10-1 which measures the temperature inside of the CPU 150A. In other words, the temperature sensor 10-1 is embedded in the CPU 150A. The temperature sensor 10-1 senses the inner temperature of the CPU 150A using a first supply voltage supplied from the PMIC 195A to the CPU 150A.

The CPU 150A may manage its inner temperature by changing its power supply voltage and/or operating frequency using inner temperature information sensed by the temperature sensor 10-1.

The GPU 160A may reduce the load of the CPU 150A and may also read and execute program instructions for graphics processing. The GPU 160A may receive data output from the external memory 131 or the internal memory 140 and may process and transmit data to the external memory 131 or the internal memory 140. For instance, the GPU 160A may execute a program and/or process data in response to an operating clock signal output from the clock controller 170.

Similar to the CPU 150A, the GPU 160A may also include a temperature sensor 10-2 which measures the temperature inside of the GPU 160A. The temperature sensor 10-2 senses the inner temperature of the GPU 160 using a second supply voltage supplied from the PMIC 195A to the GPU 160A.

The programs and/or the data stored in the external memory 131 or the internal memory 140 may be loaded to a memory in the CPU 150 or the GPU 160 when necessary.

The internal memory 140 may include read-only memory (ROM) and random access memory (RAM).

The ROM may store permanent programs and/or data. The ROM may be implemented by erasable programmable ROM (EPROM) or electrically erasable programmable ROM (EEPROM).

The RAM may temporarily store programs, data, or instructions. For instance, the programs and/or data stored in the external memory 131 may be temporarily stored in the RAM according to the control of the CPU 150 or a booting code stored in the ROM. The RAM may be implemented by dynamic RAM (DRAM) or static RAM (SRAM).

The memory controller 130 is used for the interface with the external memory 131. The memory controller 130 controls the overall operation of the external memory 131 and generally controls the data communication between a host and the external memory 131. For instance, the memory controller 130 controls the external memory 131 to write or read data at the request of the host. The host may be a master device such as the CPU 150, the GPU 160, or the display controller 110.

The external memory 131 is a storage medium for storing data and may store an operating system (OS) and various kinds of programs and data. The external memory 131 may be implemented by DRAM, but the inventive concept is not restricted to the current embodiments. The external memory 131 may be implemented by non-volatile memory such as flash memory, phase-change RAM (PRAM), magnetoresistive RAM (MRAM), resistive RAM (ReRAM) or ferroelectric RAM (FeRAM).

The elements 110 through 180 of the SoC 100A may communicate with one another through the bus 190.

The display device 111 may display data according to the control of the display controller 110. The display device 111 is a liquid crystal display (LCD) device in the current embodiments, but the inventive concept is not restricted to the current embodiments. In other embodiments, the display device 111 may be a light emitting diode (LED) display device, an organic LED (OLED) display device, a plasma display panel (PDP) device or another type of display device.

The display controller 110 controls the operations of the display device 111.

Figure 2:
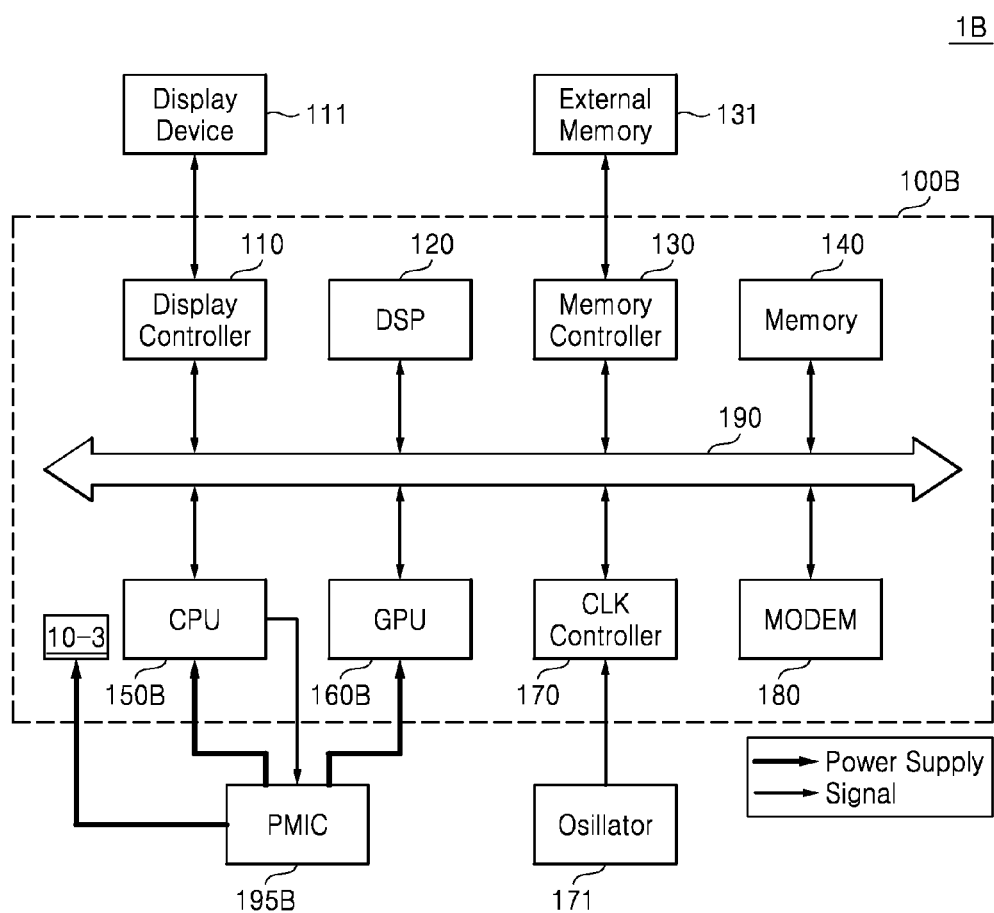
FIG. 2 is a schematic diagram of a semiconductor system including a SoC according to another exemplary embodiment.

FIG. 2 is a schematic diagram of a semiconductor system 1B including a SoC 100B according to an exemplary embodiment. The semiconductor system 1B illustrated in FIG. 2 is similar to the semiconductor system 1A illustrated in FIG. 1. Thus, differences will be mainly described to avoid redundancy.

While the temperature sensors 10-1 and 10-2 embedded within processors (i.e., the CPU 150A and the GPU 160A) and sense the inner temperatures of the processors in the semiconductor system 1A illustrated in FIG. 1, a temperature sensor 10-3 is placed outside a processor in the semiconductor system 1B illustrated in FIG. 2.

Accordingly, the temperature sensor 10-3 is not provided with power supplied to the processor but is provided with special power, i.e., exclusive power for the temperature sensor 10-3 from a PMIC 195B. For instance, the exclusive power may be an analog voltage or a digital voltage.

According to exemplary embodiments, the temperature sensor may be placed inside (10-1 and 10-2) and/or outside (10-3) a digital function module (e.g., a processor, a modem, or a controller).

Figure 3A:
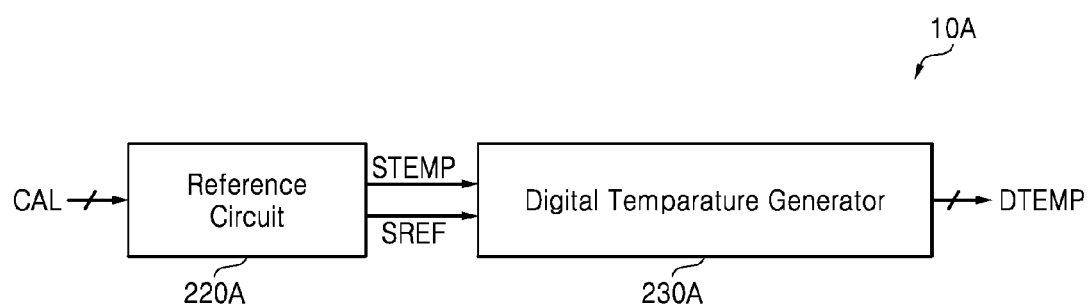
FIG. 3A is a block diagram of the structure of a temperature sensor according to an exemplary embodiment.

FIG. 3A is a block diagram of the structure of a temperature sensor 10A according to an exemplary embodiment. The temperature sensor 10A includes a reference circuit 220A and a digital temperature generator 230A.

The reference circuit 220A generates a temperature information signal STEMP which changes according to temperature and a reference signal SREF which is substantially constant regardless of temperature. For instance, the reference circuit 220A generates first and second temperature information signals, which change according to temperature, and first and second reference signals, which are substantially constant regardless of temperature. At least one of the first and second reference signals SREF1 and SREF2 is adjusted according to a calibration signal CAL.

The calibration signal CAL is a control signal for adjusting the level of a first reference voltage VREFH (FIG. 5) and the level of a second reference voltage VREFL (FIG. 5) and may be a digital control signal composed of a plurality of bits (i.e., at least two bits). The calibration signal CAL may be determined through tests or simulations of the temperature sensor 10A and may be stored in advance in the external memory 131 or the internal memory 140.

When the temperature sensor 10A is enabled, the CPU 150A or 150B illustrated in FIG. 1 or 2 may read the calibration signal CAL from the external memory 131 or the internal memory 140 and apply the calibration signal CAL to the temperature sensor 10A.

The digital temperature generator 230A generates digital temperature information DTEMP using the temperature information signal STEMP and the reference signal SREF. The temperature information signal STEMP and the reference signal SREF may be analog signals, e.g., analog voltage signals or analog current signals. The digital temperature generator 230A may convert the temperature information signal STEMP and the reference signal SREF into digital signals, respectively, and may generate the digital temperature information DTEMP by performing an operation on the digital signals. The structure and operation of the digital temperature generator 230A will be described later.

Figure 3B:
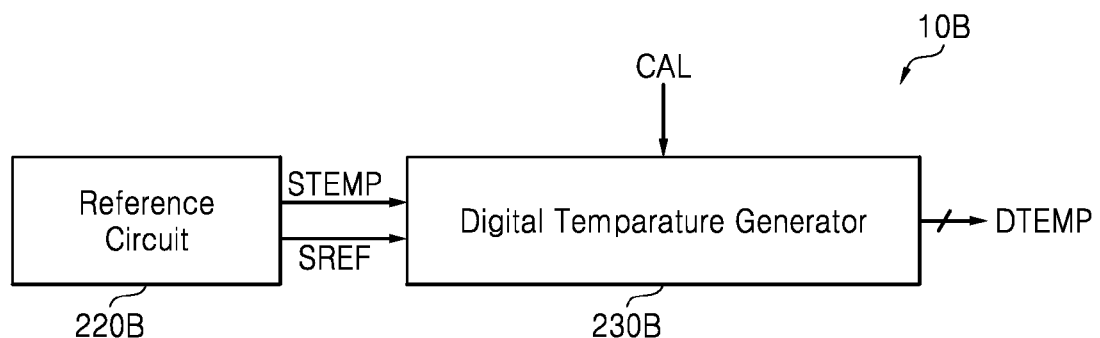
FIG. 3B is a block diagram of the structure of a temperature sensor according to another exemplary embodiment.

FIG. 3B is a block diagram of the structure of a temperature sensor according to another exemplary embodiment. The temperature sensor 10B illustrated in FIG. 3B is similar to the temperature sensor 10A illustrated in FIG. 3A, but the calibration signal CAL is applied to a digital temperature sensor 230B instead of the reference circuit 220A.

The digital temperature generator 230B converts the first and second reference signals into first and second digital reference codes, respectively, and adjusts at least one of the first and second digital reference codes based on the calibration signal. The structure and operation of the digital temperature generator 230B will be described later.

Figure 4:
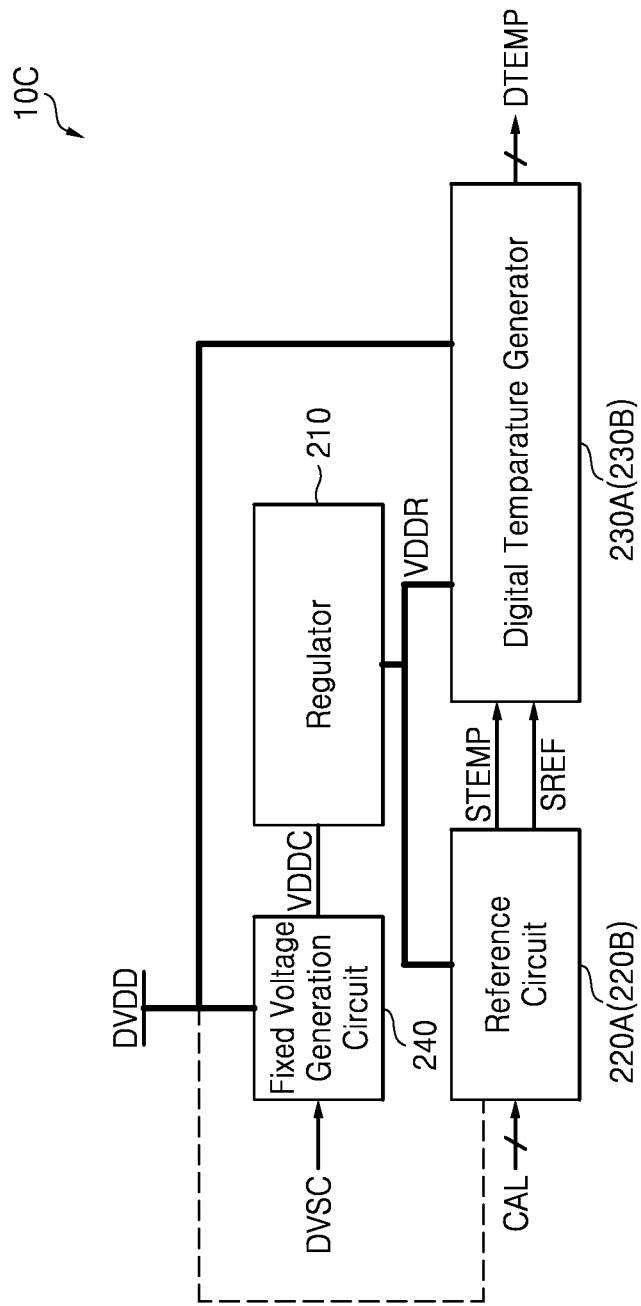
FIG. 4 is a block diagram of the structure of a temperature sensor according to another exemplary embodiment.

FIG. 4 is a block diagram of the structure of a temperature sensor 10C according to another exemplary embodiment. The temperature sensor 10C illustrated in FIG. 4 is similar to the temperature sensor 10A illustrated in FIG. 3A, but further includes a regulator 210 and a fixed voltage generation circuit 240. The reference circuit 220A and the digital temperature generator 230 of the temperature sensor 10C are the same as those of the temperature sensor 10A illustrated in FIG. 3A. Thus, description thereof will not be repeated to avoid redundancy.

The fixed voltage generation circuit 240 outputs a voltage VDDC at a constant level even when the level of a voltage DVDD input to the temperature sensor 10A, 10B or 10C (e.g., a voltage supplied to a processor) changes.

The regulator 210 receives the output voltage VDDC of the fixed voltage generation circuit 240 and generates a regulated voltage VDDR having a constant level.

In other embodiments, the fixed voltage generation circuit 240 and the regulator 210 may be omitted, in which case the supply voltage DVDD may be supplied to the reference circuit 220A or 220B (as shown by the dashed line in FIG. 4). In further embodiments, an additional power supply circuit, e.g., a charge pump circuit, a DC-DC converter, or a low drop out (LDO) regulator may also be provided. The additional power supply circuit generates a voltage, which will be input to the digital temperature generator 230A, from the supply voltage DVDD.

Further, the regulator 210 and the fixed voltage generation circuit 240 can be added to the temperature sensor of FIG. 3B in a manner similar to that of FIG. 4.

Figure 5:
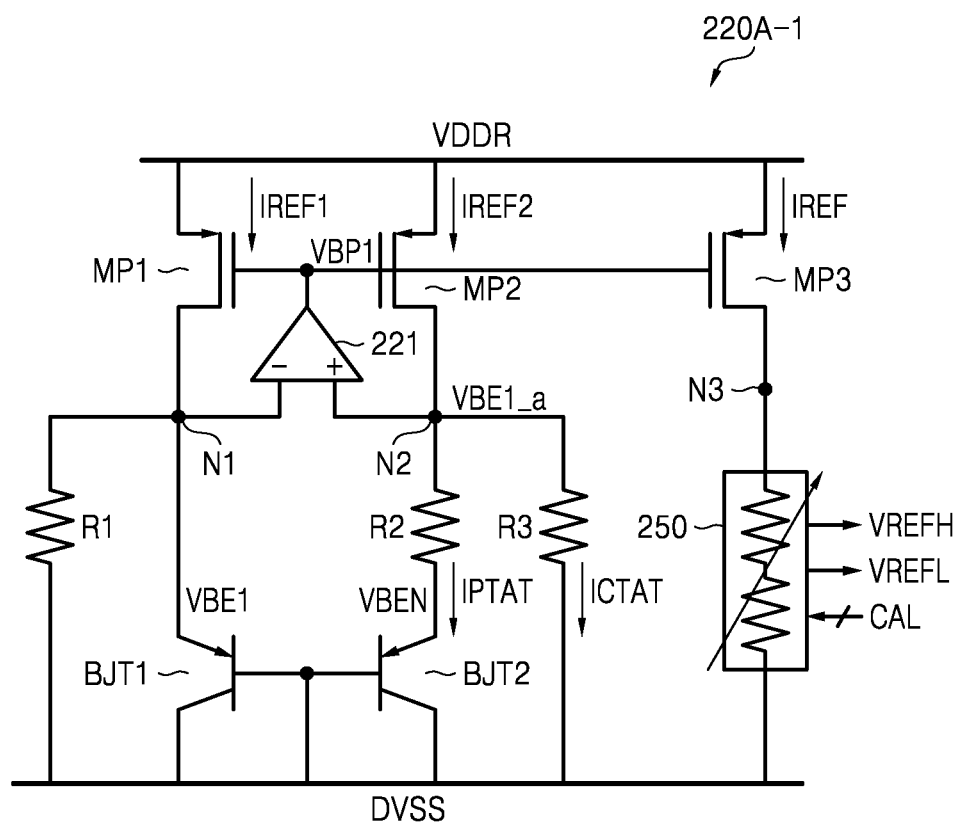
FIG. 5 is a circuit diagram of a reference circuit according to an exemplary embodiment.
Figure 6:
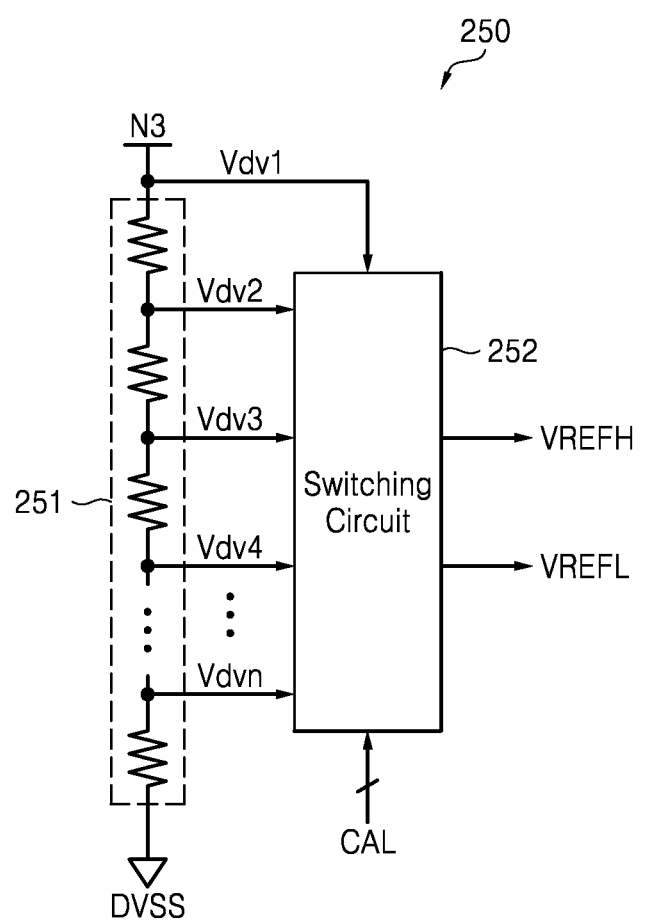
FIG. 6 is a diagram of a variable output load illustrated in FIG. 5 according to an exemplary embodiment.
Figure 7:
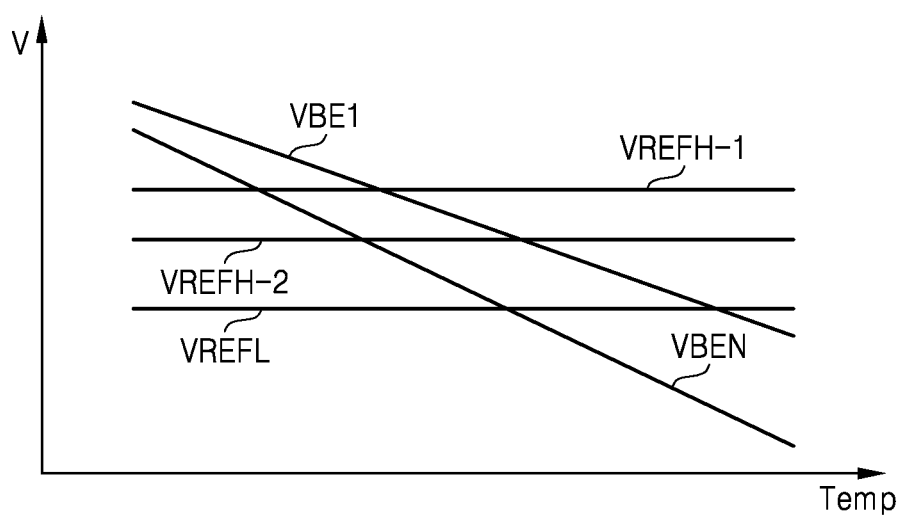
FIG. 7 is a graph schematically illustrating the changes in voltage and current of the reference circuit illustrated in FIG. 5 with respect to temperature.

FIG. 5 is a circuit diagram of a reference circuit 220A-1 according to an exemplary embodiment. The reference circuit 220A illustrated in FIGS. 3A and 4 may be implemented as the reference circuit 220A-1 but is not limited thereto. FIG. 6 is a diagram of a variable output load 250 illustrated in FIG. 5 according to an exemplary embodiment. FIG. 7 is a graph schematically illustrating the changes in voltage and current of the reference circuit 220A-1 illustrated in FIG. 5 with respect to temperature.

Referring to FIGS. 5 through 7, the reference circuit 220C may be a bandgap reference circuit and include first through third P-channel metal oxide semiconductor (PMOS) transistors MP1, MP2, and MP3, first and second bipolar junction transistors (BJTs) BJT1 and BJT2, an operational amplifier 221, first through third loads R1, R2, and R3, and an variable output load 250.

The first PMOS transistor MP1 is connected between the first supply voltage DVDD (or the regulated voltage VDDR if the regulator 210 is included in the temperature sensor) and a first node N1. The second PMOS transistor MP2 is connected between the first supply voltage DVDD (or the regulated voltage VDDR if the regulator 210 is included in the temperature sensor) and a second node N2. The third PMOS transistor MP3 is connected between the first supply voltage DVDD (or regulated voltage VDDR if the regulator 210 is included in the temperature sensor) and the output load RL.

The first BJT BJT1 and the first load R1 are connected in parallel with each other between the first node N1 and the second power supply voltage DVSS.

The second load R2 and the second BJT BJT2 are connected in series with each other between the second node N2 and the second power supply voltage DVSS. The third load R3 is connected between the second node N2 and the second power supply voltage DVSS. The bases of the respective first and second BJTs BJT1 and BJT2 are connected in common to the second power supply voltage DVSS.

The size of the second BJT BJT2 may be N (which is a real number greater than 1) times greater than that of the first BJT BJT1. When N is an integer of at least 2, the second BJT BJT2 may be formed by connecting N BJTs having the same size as the first BJT BJT1 in parallel with each other.

The operational amplifier 221 receives a signal of the first node N1 and a signal of the second node N2 as input signals. An output node of the operational amplifier 221 is connected in common to gates of the respective first and second PMOS transistors MP1 and MP2.

A gate of the third PMOS transistor MP3 is connected in common to the gates of the respective first and second PMOS transistors MP1 and MP2. The variable output load 250 is connected between a drain of the third PMOS transistor MP3 and the second power supply voltage DVSS.

Typically, a base-emitter voltage VBE of a BJT is inversely proportional to temperature. The voltage of the first node N1 is a base-emitter voltage VBE1 of the first BJT BJT1. Accordingly, the first node voltage VBE1 decreases as the temperature increases. As a result, a voltage across the first load R1 decreases and current flowing in the first load R1 has a complementary-to-absolute temperature (CTAT) characteristic, that is, the current is in inverse proportion to absolute temperature.

A base-emitter voltage VBEN of the second BJT BJT2 also decreases as the temperature increases. Since the size of the second BJT BJT2 is N times of that of the first BJT BJT1, a variation of the base-emitter voltage VBEN of the second BJT BJT2 with respect to the temperature is greater than that of the base-emitter voltage VBE1 of the first BJT BJT1 with respect to the temperature.

Both input signals of the operational amplifier 221 are substantially the same as each other, and therefore, a voltage VBE1_a of the second node N2 is substantially the same as the voltage VBE1 of the first node N1. Accordingly, the second node voltage VBE1_a also decreases as the temperature increases and a voltage across the third load R3 also decreases, so that a current ICTAT flowing in the third load R3 has the CTAT characteristic.

However, a variation of the second node voltage VBE1_a with respect to the temperature is less than that of the base-emitter voltage VBEN of the second BJT BJT2 with respect to the temperature, and therefore, a voltage difference between both ends of the second load R2 increases as the temperature increases. Accordingly, as shown in FIG. 7, a current IPTAT flowing in the second load R2 has a proportional-to-absolute temperature (PTAT) characteristic.

The sum of the current IPTAT flowing in the second load R2 and the current ICTAT flowing in the third load R3 is a second reference current IREF2. The PTAT characteristic of the current IPTAT flowing in the second load R2 may be compensated or offset by the CTAT characteristic of the current ICTAT flowing in the third load R3.

An output current IREF flowing into the variable output load 250 through the third PMOS transistor MP3 is substantially the same as the second reference current IREF2. The product of the variable output load 250 and the output current IREF, i.e., a voltage across the variable output load 250 can be maintained constant. Consequently, reference voltages VREFH and VREFL that are constant regardless of the temperature can be obtained from the variable output load 250.

In the current exemplary embodiments, the first and second reference voltages VREFH and VREFL have different levels from each other. For example, the first reference voltage VREFH is higher than the second reference voltage VREFL.

As shown in FIG. 6, the variable output load 250 may include a resistor string circuit 251 and a switching circuit 252. The resistor string circuit 251 includes a plurality of resistors connected between a third node N3 and the second power supply voltage DVSS. The resistor string circuit 251 divides a voltage of the third node N3 into a plurality of, i.e., "n" divided voltages Vdv1 through Vdvn (where "n" is an integer greater than or equal to 2). The second power supply voltage DVSS may be a ground voltage but is not restricted thereto.

The switching circuit 252 selects and outputs voltages respectively having different levels among the divided voltages Vdv1 through Vdvn as the first reference voltage VREFH and the second reference voltage VREFL in response to the calibration signal CAL. Only one of the first and second reference voltages VREFH and VREFL may be adjusted while the other is fixed according to the calibration signal CAL. For instance, as shown in FIG. 7, the level of the first reference voltage VREFH may be adjusted from VREFH-1 to VREFH-2 while the level of the second reference voltage VREFL is controlled to be constant according to the calibration signal CAL.

As described above, the reference circuit 220C generates the first and second temperature information voltages VBE1 and VBEN that vary with temperature and the first and second reference voltages VREFH and VREFL that are constant regardless of the temperature. In other words, it is not necessary to separately provide a circuit that generates the temperature information voltages VBE1 and VBEN varying with the temperature and a circuit that generates the reference voltages VREFH and VREFL constant regardless of the temperature.

Herein, the phrase "constant regardless of the temperature" does not mean being completely the same physically or without any variation but instead means substantially constant with a slight variation that can be relatively ignored as compared to the variation of the values (e.g., VBE1 and VBEN) varying with the temperature.

Figure 8A:
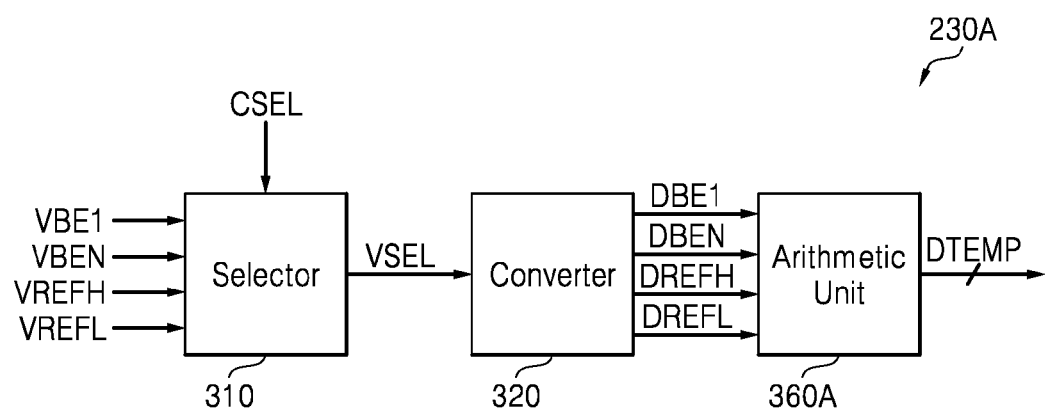
FIG. 8A is a block diagram of the structure of a digital temperature generator illustrated in FIGS. 3A and 4 according to an exemplary embodiment.

FIG. 8A is a block diagram of the structure of the digital temperature generator 230A illustrated in FIGS. 3A and 4 according to an exemplary embodiment. Referring to FIG. 8A, the digital temperature generator 230A includes a converter 320 and an arithmetic unit 360A.

The converter 320 converts first and second temperature information signals and first and second reference signals, which are output from the reference circuit 220, into first and second digital temperature codes and first and second digital reference codes, respectively. For instance, the converter 320 may convert the first and second temperature information voltages VBE1 and VBEN and the first and second reference voltages VREFH and VREFL, which are analog voltage signals, into first and second digital temperature codes DBE1 and DBEN and first and second digital reference codes DREFH and DREFL, respectively, which are digital signals. The converter 320 may receive the first and second temperature information voltages VBE1 and VBEN and the first and second reference voltages VREFH and VREFL in parallel and convert them into the first and second digital temperature codes DBE1 and DBEN and the first and second digital reference codes DREFH and DREFL, in parallel.

However, in the exemplary embodiment illustrated in FIG. 8A, the converter 320 sequentially receives the first and second temperature information voltages VBE1 and VBEN and the first and second reference voltages VREFH and VREFL and sequentially converts them into the first and second digital temperature codes DBE1 and DBEN and the first and second digital reference codes DREFH and DREFL, respectively.

For the sequential conversion, a selector 310 that sequentially selects the first and second temperature information voltages VBE1 and VBEN and the first and second reference voltages VREFH and VREFL may be provided before the converter 320. The selector 310 sequentially selects the first temperature information voltage VBE1, the second temperature information voltage VBEN, the first reference voltage VREFH, and the second reference voltage VREFL and outputs the selected one as a selected voltage VSEL according to a selection control signal CSEL.

Figure 8B:
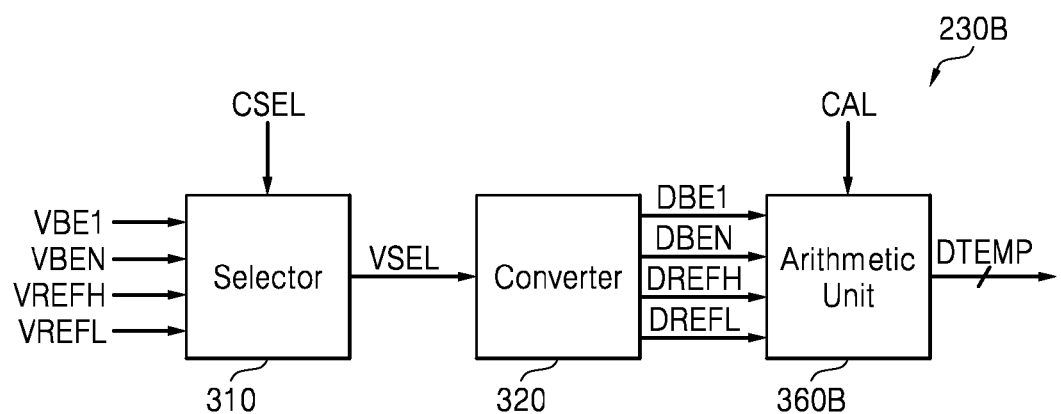
FIG. 8B is a block diagram of the structure of a digital temperature generator illustrated in FIG. 3B according to another exemplary embodiment.

FIG. 8B is a block diagram of the structure of the digital temperature generator 230B illustrated in FIG. 3B according to an exemplary embodiment. In the digital temperature generator 230B, the calibration signal CAL is applied to an arithmetic unit 360B and calibration of the temperature sensor is performed in the arithmetic unit 360B by changing a slope of the digital temperature information signal DTEMP.

In particular, at least one of the first and second digital reference codes DREFH and DREFL is adjusted digitally in the arithmetic unit 360B according to the calibration signal CAL. As a result, a ratio of the first and second temperature information codes DBE1 and DBEN to the first and second digital reference codes DREFH and DREFL is changed (i.e., the slope of DTEMP is changed), as will be described in detail later.

In the case where the calibration signal CAL is applied to the digital temperature generator 230B (FIGS. 3B and 8B) rather than the reference circuit 220A (220A-1 in FIGS. 5 and 220A-2 in FIG. 14), the variable output load 250 of the reference circuit 220A (220A-1 in FIGS. 5 and 220A-2 in FIG. 14) is replaced with an output load that is not variable.

Figure 9:
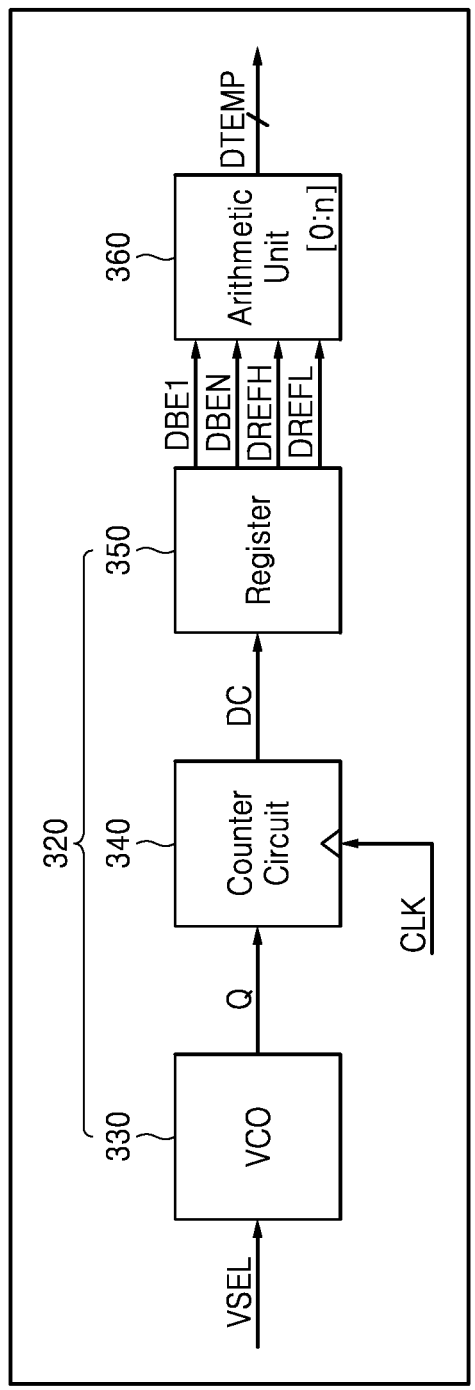
FIG. 9 is a block diagram of the structure of a converter according to an exemplary embodiment.

FIG. 9 is a block diagram of the structure of the converter 320 illustrated in FIGS. 8A and 8B according to an exemplary. Referring to FIG. 9, the converter 320 may include a voltage-controlled oscillator (VCO) 330, a counter circuit 340, and a register 350.

The VCO 330 outputs an oscillation signal Q whose frequency varies with the voltage level of an input signal. The counter circuit 340 counts the oscillation signal Q using a reference clock signal CLK and outputs a count value.

The register 350 stores the count value output from the counter circuit 340.

However, the structure of the converter 320 is not limited to that shown in FIG. 9. For example, the VCO 330 and the counter circuit 340 of the converter 320 can be replaced with another type of analog-to-digital converter (ADC) such as a successive-approximation register (SAR) ADC, a Delta-Sigma ADC, etc.

Figure 10:
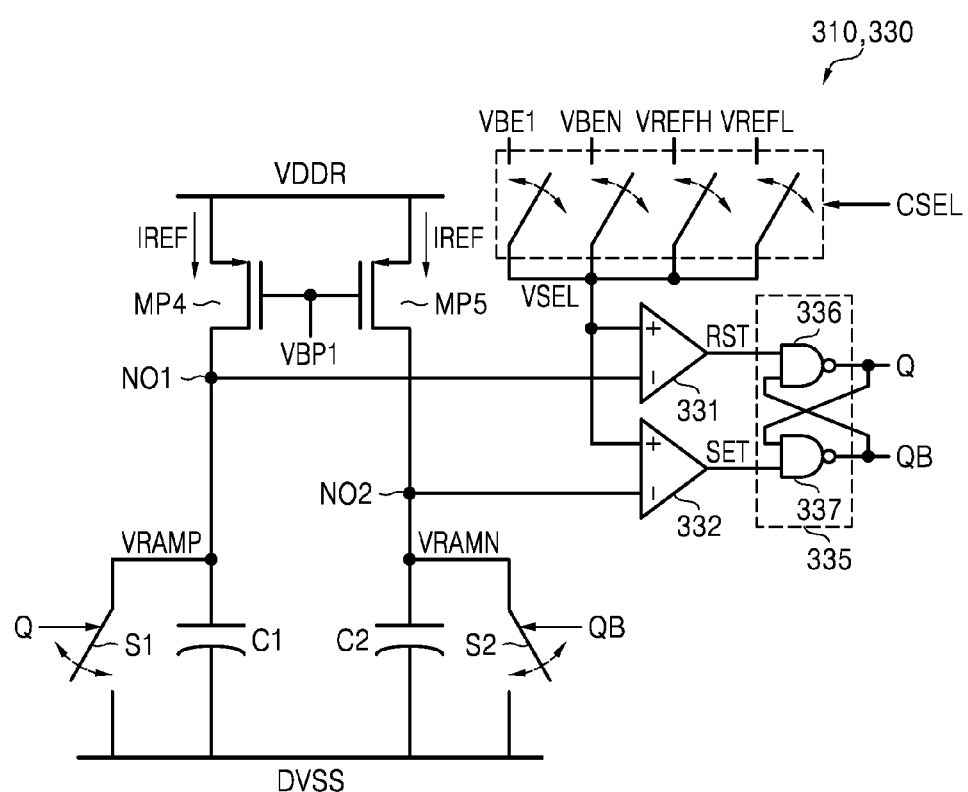
FIG. 10 is a circuit diagram of a selector and a voltage-controlled oscillator (VCO) illustrated in FIG. 9 according to an exemplary embodiment.

FIG. 10 is a circuit diagram of the selector 310 and the VCO 330 illustrated in FIG. 9 according to some embodiments of the inventive concept. Referring to FIG. 10, the selector 310 selects and outputs one of the first and second temperature information voltages VBE1 and VBEN and the first and second reference voltages VREFH and VREFL as the selected voltage VSEL according to the selection control signal CSEL.

The VCO 330 includes first and second oscillation transistors MP4 and MP5, first and second capacitors C1 and C2, first and second switches S1 and S2, first and second comparators 331 and 332, and a latch 335.

The first oscillation transistor MP4 is connected between a first power supply voltage VDDR and a first output node NO1. A gate of the first oscillation transistor MP4 is connected in common to the gates of the respective first through third PMOS transistors MP1 through MP3. The second oscillation transistor MP5 is connected between the first power supply voltage VDDR and a second output node NO2. A gate of the second oscillation transistor MP5 is connected with the gate of the first oscillation transistor MP4.

The first capacitor C1 is connected between the first output node NO1 and the second power supply voltage DVSS. The second capacitor C2 is connected between the second output node NO2 and the second power supply voltage DVSS. The first and second capacitors C1 and C2 have substantially the same capacitance C.

The first switch S1 is connected in parallel with the first capacitor C1 and is opened or closed in response to a latch output signal Q. The second switch S2 is connected in parallel with the second capacitor C2 and is opened or closed in response to an inverted latch output signal QB.

The first comparator 331 compares the output signal VSEL of the selector 310 with a signal VRAMP of the first output node NO1. The second comparator 332 compares the output signal VSEL of the selector 310 with a signal VRAMN of the second output node NO2.

The latch 335 latches an output signal of the first and second comparators 331 and 332.

Figure 11:
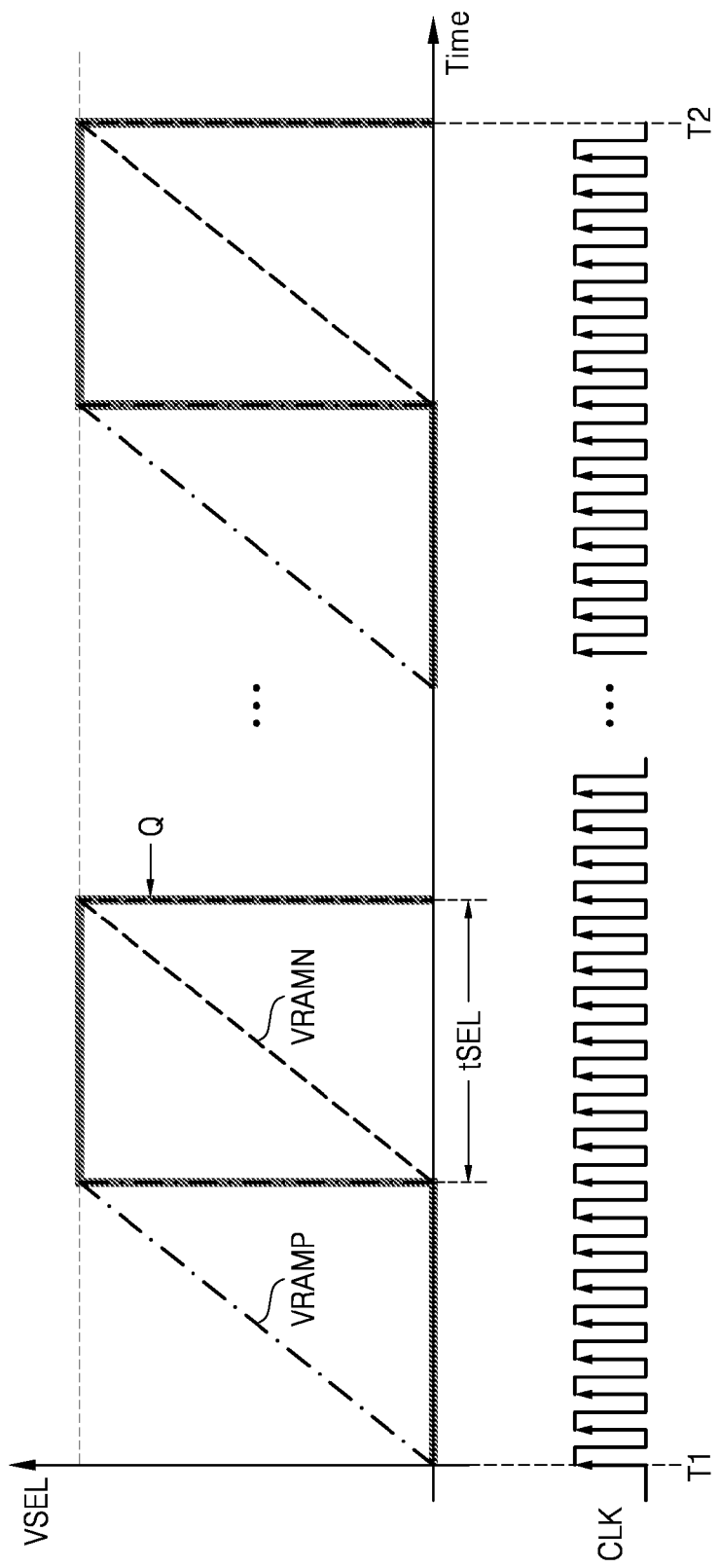
FIG. 11 is a schematic waveform diagram of some signals of the VCO illustrated in FIG. 10.

FIG. 11 is a schematic waveform diagram of some signals of the VCO 330 illustrated in FIG. 10. Referring to FIGS. 10 and 11, while the latch output signal Q is at a first logic level (e.g., "0") and the inverted latch output signal QB is at a second logic level (e.g., "1"), the first switch S1 is opened and the second switch S2 is closed. Accordingly, the voltage VRAMP of the first output node NO1 increases over time. While the voltage VRAMP of the first output node NO1 is lower than the output voltage VSEL of the selector 310, an output signal RST of the first comparator 331 is "1". When the voltage VRAMP of the first output node NO1 is the same as the output voltage VSEL of the selector 310, the output signal RST of the first comparator 331 becomes "0". When the output signal RST of the first comparator 331 becomes "0", the latch output signal Q transits to "1". Then, the first switch S1 is closed and the second switch S2 is opened. Accordingly, the voltage VRAMN of the second output node NO2 increases over time. While the voltage VRAMN of the second output node NO2 is lower than the output voltage VSEL of the selector 310, an output signal SET of the second comparator 332 is "1". When the voltage VRAMN of the second output node NO2 is the same as the output voltage VSEL of the selector 310, the output signal SET of the second comparator 332 becomes "0". When the output signal SET of the second comparator 332 becomes "0", the inverted latch output signal QB transits to "1".

As described above, periods in which the voltage VRAMP of the first output node NO1 increases up to the output voltage VSEL of the selector 310, i.e., periods in which the latch output signal Q is "0" and the inverted latch output signal QB is "1" alternate with periods in which the voltage VRAMN of the second output node NO2 increases up to the output voltage VSEL of the selector 310, i.e., periods in which the latch output signal Q is "1" and the inverted latch output signal QB is "0". Accordingly, the oscillation signal Q having a regular period is output.

½ period tSEL or a single period of the oscillation signal Q varies with the level of the output voltage VSEL of the selector 310, the capacitance C of the first and second capacitors C1 and C2, and the intensity of the reference current IREF. For instance, as the output voltage VSEL of the selector 310 increases, the ½ period tSEL of the oscillation signal Q also increases. As the capacitance C of the first and second capacitors C1 and C2 decreases, the ½ period tSEL of the oscillation signal Q also decreases.

When the capacitance C of the first and second capacitors C1 and C2 and the intensity of the reference current IREF are constant, the period (or frequency) of the oscillation signal Q varies with the output voltage VSEL of the selector 310.

Referring back to FIG. 9, the oscillation signal Q output from the VCO 330 is input to the counter circuit 340.

The counter circuit 340 may include, for example, a master counter which generates an enable signal which maintains a high state from a first rising edge of the oscillation signal Q during predefined cycles, and a slave counter which counts the reference clock signal CLK during the enable signal generated by the master counter. An output of the slave counter is a digital code DC resulting from converting the selected output voltage VSEL into a digital code.

The register 350 stores the digital code DC output from the second counter 342.

Since the selector 310 sequentially selects the first temperature information voltage VBE1, the second temperature information voltage VBEN, the first reference voltage VREFH, and the second reference voltage VREFL, digital codes, i.e., the first temperature information code DBE1, the second temperature information code DBEN, the first reference code DREFH, and the second reference code DREFL respectively corresponding to the first temperature information voltage VBE1, the second temperature information voltage VBEN, the first reference voltage VREFH, and the second reference voltage VREFL are sequentially stored in the register 350.

The arithmetic unit 360A or 360B receives the first temperature information code DBE1, the second temperature information code DBEN, the first reference code DREFH, and the second reference code DREFL, performs an operation on them, and outputs the digital temperature information signal DTEMP. The arithmetic unit 360A or 360B may calculate a first difference signal between the first temperature information code DBE1 and the second temperature information code DBEN and a second difference signal between the first reference code DREFH and the second reference code DREFL and may obtain the digital temperature information signal DTEMP by calculating a ratio of the first difference signal to the second difference signal.

The arithmetic unit 360A or 360B may calculate the digital temperature information signal DTEMP using Equation 1 as follows:

$$DTEMP = \frac{DBE1 - DBEN}{DREFH - DREFL} \quad \text{(Equation 1)}$$
$$= \frac{K \cdot C \cdot VBE1/IREF - K \cdot C \cdot VBEN/IREF}{K \cdot C \cdot VREFH/IREF - K \cdot C \cdot VREFL/IREF}$$
$$= \frac{G(VBE1 - VBEN)}{G(VREFH - VREFL)},$$

where C is the capacitance of the first and second capacitors C1 and C2, K is a digital converting constant value, and G is K·C/IREF.

As shown in Equation 1, even when the capacitance C changes, the influence of the capacitance C exerted on the digital temperature information signal DTEMP is counterbalanced through division. In addition, when the temperature does not change while the first temperature information code DBE1, the second temperature information code DBEN, the first reference code DREFH, and the second reference code DREFL are generated, the reference current IREF does not influence the digital temperature information signal DTEMP. Moreover, errors such as charge-injection that may occur during the operation of switches and a comparator offset are counterbalanced through subtraction in the denominator and numerator in Equation 1. Accordingly, most of the errors occurring in the VCO 330 can be solved using Equation 1. Therefore, errors or offsets occurring in processes are compensated for, so that the accuracy of temperature sensing is increased.

The slope or level of the first and second temperature information voltage VBE1 and VBEN, i.e., the voltages of the first and second BJTs and the slope or level of the first and second reference voltages VREFH and VREFL having different levels from each other may vary according to process mismatches and process changes. Errors occurring due to these variations may be corrected by adjusting the first reference voltage VREFH and/or the second reference voltage VREFL according to the calibration signal CAL.

For instance, when a desired value (i.e., a digital temperature signal) is not obtained at a particular temperature (i.e., a known temperature), the value of the calibration signal CAL is changed and the first reference voltage VREFH and/or the second reference voltage VREFL is adjusted. Then, the second difference signal is changed and the denominator is changed in Equation 1. As a result, the ratio of the first difference signal to the second difference signal is changed, and therefore, the slope of a graph of the digital temperature information signal DTEMP varying with the temperature is changed.

Accordingly, the first reference voltage VREFH and/or the second reference voltage VREFL with which the desired digital temperature information signal DTEMP is obtained at a particular temperature is acquired and then the calibration signal CAL corresponding to the first reference voltage VREFH and/or the second reference voltage VREFL is found and applied, so that the calibration (i.e., correction) of the digital temperature information signal DTEMP is accomplished.

Figure 12:
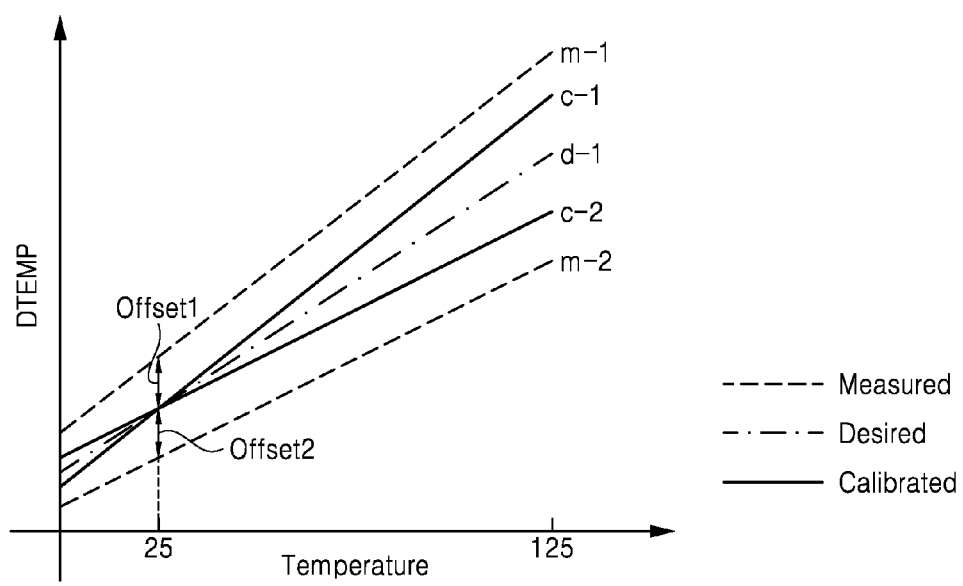
FIG. 12 is a graph for explaining temperature calibration in a comparison example.

FIG. 12 is a graph for explaining temperature calibration in a comparison example. In FIG. 12, "m-1" and "m-2" denote temperatures measured before the calibration; "c-1" and "c-2" denote temperatures DTEMP after the calibration; and "d-1" denotes a desired temperature, i.e., a target temperature.

Referring to FIG. 12, the measured temperature "m-1" is higher than the desired temperature "d-1" and the measured temperature "m-2" is lower than the desired temperature "d-1". For instance, the measured temperature "m-1" is higher than the desired temperature "d-1" by a first offset Offset1 at a particular temperature (e.g., 25° C.) and the measured temperature "m-2" is lower than the desired temperature "d-1" by a second offset Offset2 at the particular temperature (e.g., 25° C.). In this case, a calibrated temperature can be obtained by uniformly subtracting the first offset Offset1 from or adding the second offset Offset2 to a temperature measured at any temperature. The temperature "c-1" or "c-2" is a temperature obtained by uniformly subtracting an error (i.e., an offset) between the measured temperature and the target temperature at the particular temperature (e.g., 25° C.) from or adding the error to any measured temperature.

In detail, "c-1" is a calibrated temperature obtained by uniformly subtracting the first offset Offset1 from the measured temperature "m-1" and "c-2" is a calibrated temperature obtained by uniformly adding the second offset Offset2 to the measured temperature "m-2". As shown in FIG. 12, in case where a difference between a measured temperature and a desired temperature increases as the temperature increases, accuracy decreases as the temperature increases when the calibration, i.e., uniform subtraction or addition of an offset illustrated in FIG. 12 is used.

Figure 13:
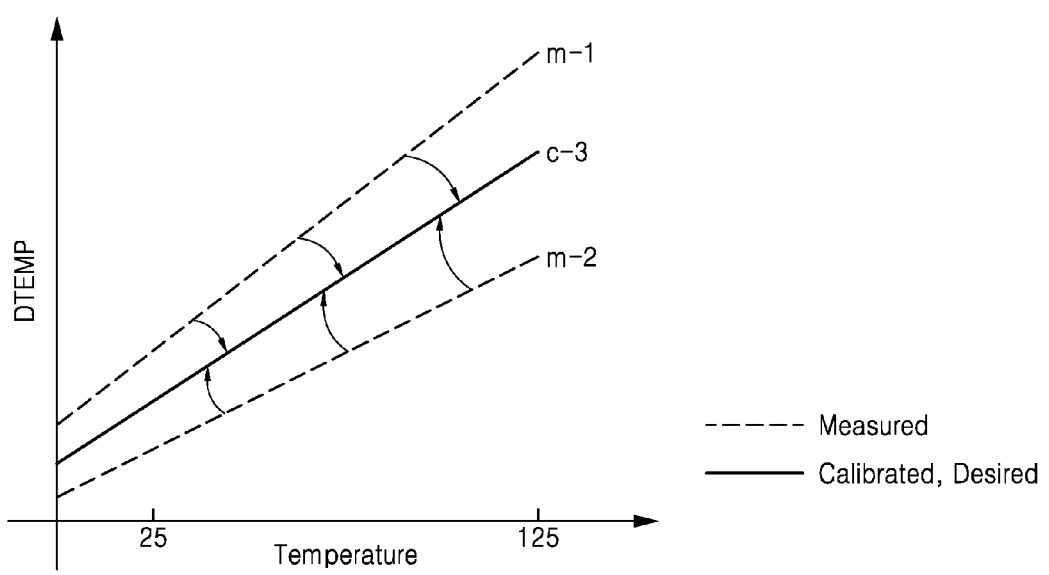
FIG. 13 is a graph for explaining temperature calibration according to an exemplary embodiment.

FIG. 13 is a graph for explaining temperature calibration according to some embodiments of the inventive concept. In the embodiments illustrated in FIG. 13 like the comparison example illustrated in FIG. 12, "m-1" and "m-2" denote temperatures measured before the calibration, for example, the digital temperature information signal DTEMP obtained before the change of the calibration signal CAL; and "c-3" is a target temperature and a temperature obtained after the calibration, e.g., the digital temperature information signal DTEMP obtained after the change of the calibration signal CAL.

According to the current exemplary embodiment, the calibration signal CAL is changed when a desired temperature is not obtained at the particular temperature (e.g., 25° C.), so that the first reference voltage VREFH and/or the second reference voltage VREFL is adjusted, as described above. In other words, the calibration signal CAL is changed so that the temperature measured at the particular temperature (e.g., 25° C.) is the same as the desired temperature and the first reference voltage VREFH and/or the second reference voltage VREFL is adjusted according to the calibration signal CAL that has been changed. When the first reference voltage VREFH and/or the second reference voltage VREFL is adjusted, the second difference signal is changed and the denominator in Equation 1 is changed. As a result, the ratio of the first difference signal to the second difference signal is changed and the slope of the graph of the digital temperature information signal DTEMP varying with the temperature is also changed. Therefore, as shown in FIG. 13, the calibrated temperature "c-3" is the same as the desired temperature (i.e., target temperature). Although the target temperature is the same as the calibrated temperature "c-3" in the embodiments illustrated in FIG. 3, the target temperature may be different from the calibrated temperature in other embodiments. However, the calibrated temperature "c-3" is close to the target temperature in the exemplary embodiments. Therefore, as well as the accuracy at the particular temperature (e.g., 25° C.), the accuracy at high temperature is improved in the exemplary embodiments as compared to the calibration illustrated in FIG. 12.

Figure 14:
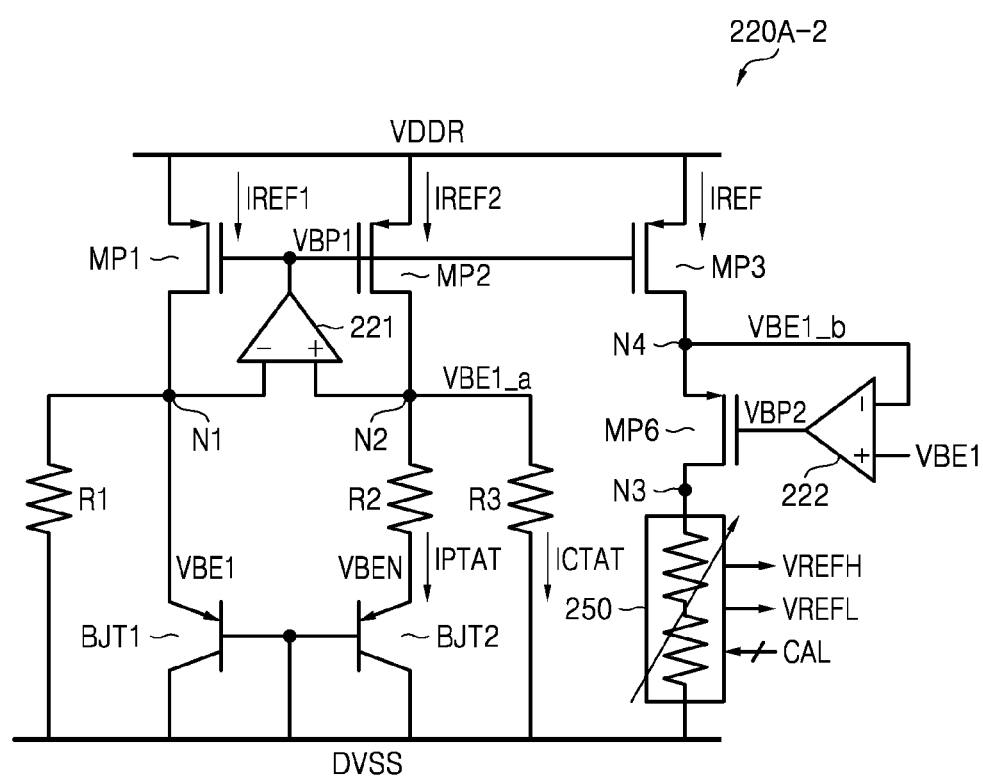
FIG. 14 is a circuit diagram of the reference circuit illustrated in FIGS. 3A and 4 according to another exemplary embodiment.

FIG. 14 is a circuit diagram of a reference circuit 220A-2 according to another exemplary embodiment. The reference circuit 220A illustrated in FIGS. 3A and 4 may be implemented as the reference circuit 220A-2 but is not limited thereto. The reference circuit 220A-2 illustrated in FIG. 14 is similar to the reference circuit 220A-1 illustrated in FIG. 5. Thus, differences between FIG. 14 and FIG. 5 will be mainly described to avoid redundancy.

The reference circuit 220A-2 illustrated in FIG. 14 further includes a second operational amplifier 222 and a fourth PMOS transistor MP6 as compared to the reference circuit 220A-1 illustrated in FIG. 5.

The fourth PMOS transistor MP6 is interposed between the third PMOS transistor MP3 and the output load RL. The second operational amplifier 222 receives the first node voltage VBE1 and a third node voltage VBE1_b as input signals. An output signal VBP2 of the second operational amplifier 222 is input to a gate of the fourth PMOS transistor MP6. Both input signals VBE1 and VBE1_b of the second operational amplifier 222 are substantially the same as each other, and therefore, the third node voltage VBE1_b is substantially the same as the first node voltage VBE1.

The second node voltage VBE1_a and the third node voltage VBE1_b are substantially the same as the first node voltage VBE1, and therefore, the reference current IREF can be maintained constant like the second reference current IREF2.

Figure 15A:
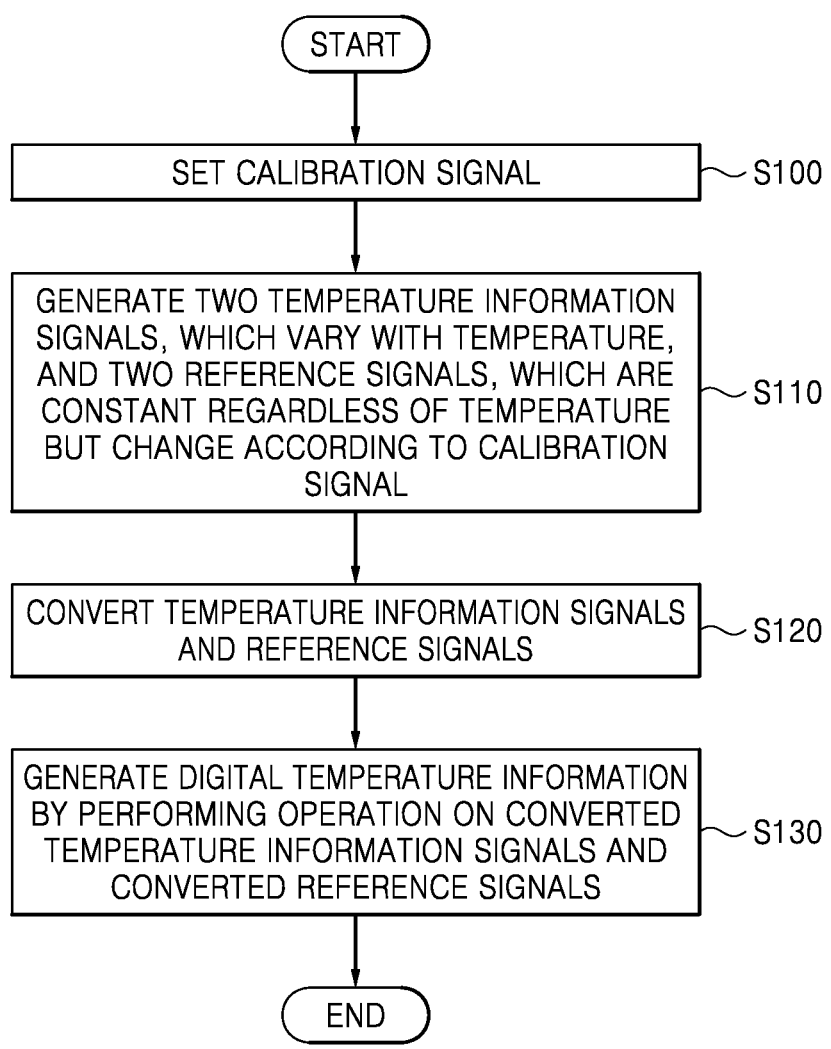
FIG. 15A is a flowchart of a method of operating a temperature sensor according to an exemplary embodiment.

FIG. 15A is a flowchart of a method of operating a temperature sensor according to an exemplary embodiment. The method illustrated in FIG. 15A may be performed by the temperature sensor 10A or 10C.

Referring to FIG. 15A, the calibration signal CAL is set in operation S100. As described above, the calibration signal CAL may be determined through tests or simulations of the temperature sensor 10A or 10C and stored in advance in the memory 131 or 140.

The calibration signal CAL is applied to the reference circuit 220A-1 or 220A-2. First and second temperature information signals, which vary with temperature, and first and second reference signals, which are constant regardless of the temperature but are adjusted according to the calibration signal CAL, are generated in operation S110.

Next, first and second temperature information codes and first and second reference codes are generated by converting the first and second temperature information signals and the first and second reference signals into digital signals, respectively, in operation S120.

A digital temperature signal is generated using the first and second temperature information codes and the first and second reference codes in operation S130. In detail, a first difference signal between the first and second temperature information codes and a second difference signal between the first and second reference codes may be calculated and the digital temperature signal may be calculated by dividing the first difference signal by the second difference signal.

Figure 15B:
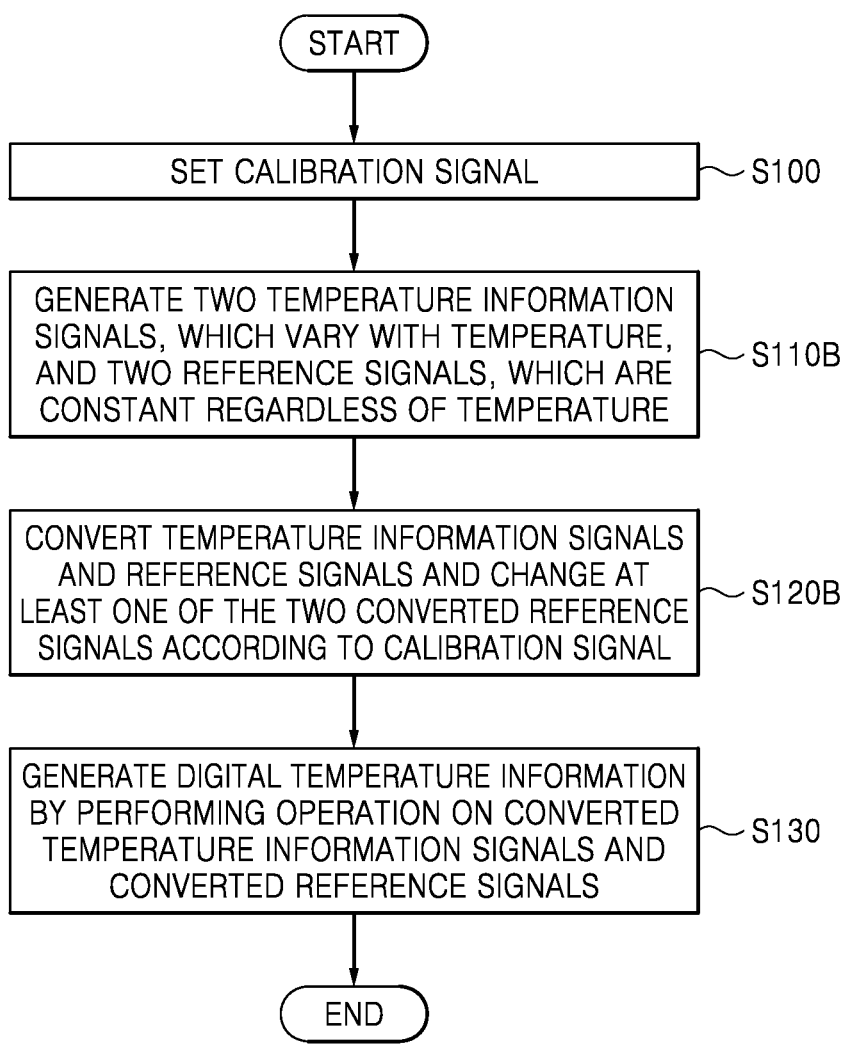
FIG. 15B is a flowchart of a method of operating a temperature sensor according to another exemplary embodiment.

FIG. 15B is a flowchart of a method of operating a temperature sensor according to an exemplary embodiment. The method illustrated in FIG. 15B may be performed by the temperature sensor 10B. Operations S100 and S130 of the method of FIG. 15B are the same as those of the method illustrated in FIG. 15A. Thus, description thereof will not be repeated to avoid redundancy.

First and second temperature information signals, which vary with temperature, and first and second reference signals, which are constant regardless of the temperature, are generated in operation S110B.

Next, in operation S120B, first and second temperature information codes and first and second reference codes are generated by converting the first and second temperature information signals and the first and second reference signals into digital signals, respectively, and at least one of the first and second reference codes is changed according to the calibration signal CAL by the arithmetic unit 230B.

Figure 16:
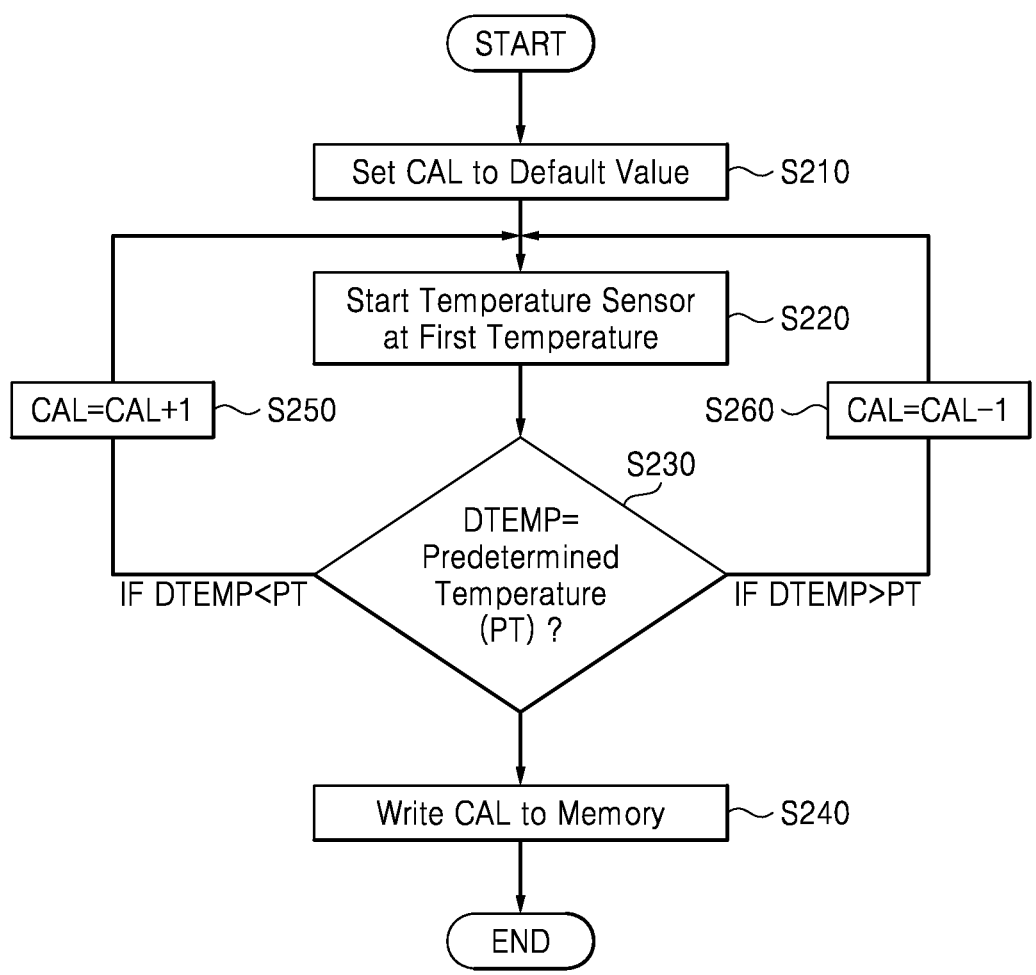
FIG. 16 is a flowchart of a method of operating a temperature sensor according to an exemplary embodiment.

FIG. 16 is a flowchart of a method of operating a temperature sensor according to another exemplary embodiment. The method illustrated in FIG. 16 may be used to find an optimal calibration signal at the stage of testing the temperature sensor.

The calibration signal CAL is set to a default value in operation S210. Next, the calibration signal CAL is applied to a reference circuit at a particular temperature (a first temperature already known) to start the temperature sensor in operation S220. The temperature sensor may generate first and second temperature information signals and first and second reference signals according to the calibration signal CAL at the first temperature using the reference circuit and may generate the digital temperature information signal DTEMP at the first temperature using the first and second temperature information signals and the first and second reference signals.

Next, the digital temperature information signal DTEMP generated at the first temperature is compared with a predetermined temperature PT in operation S230. According to a result of the comparison in operation S230, the calibration signal CAL may be changed and operations S220 and S230 may be repeated until the digital temperature information signal DTEMP generated at the first temperature is the same as the predetermined temperature PT.

For instance, when the digital temperature information signal DTEMP generated at the first temperature is less than the predetermined temperature PT in operation S230, the calibration signal CAL is increased in operation S250 and operations S220 and S230 are performed using the calibration signal CAL that has been increased. When the digital temperature information signal DTEMP generated at the first temperature is greater than the predetermined temperature PT in operation S230, the calibration signal CAL is decreased in operation S260 and operations S220 and S230 are performed using the calibration signal CAL that has been decreased.

When the digital temperature information signal DTEMP generated at the first temperature is the same as the predetermined temperature PT in operation S230 through the repetition, the current calibration signal CAL is written to a memory in operation S240.

Figure 17:
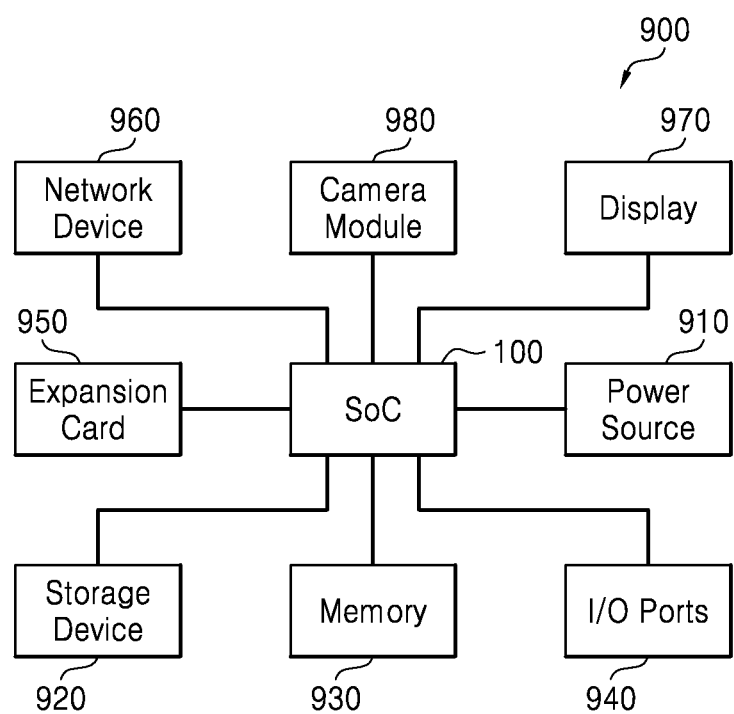
FIG. 17 is a block diagram of an electronic system including a SoC according to an exemplary embodiment.

FIG. 17 is a block diagram of an electronic system 900 including the SoC according to an exemplary embodiment. Referring to FIG. 13, the electronic system 900 may be implemented as a PC, a data server, or a portable device.

The portable device may be a laptop computer, a cellular phone, a smart phone, a tablet personal computer (PC), a personal digital assistant (PDA), an enterprise digital assistant (EDA), a digital still camera, a digital video camera, a portable multimedia player (PMP), portable navigation device (PDN), a handheld game console, or an e(electronic)-book device.

The electronic system 900 includes the SoC 100, a power source 910, a storage device 920, a memory 930, input/output (I/O) ports 940, an expansion card 950, a network device 960, and a display 970. The electronic system 900 may further include a camera module 980.

The SoC 100 may correspond to the SoC 100A illustrated in FIG. 1 and/or the SoC 100B illustrated in FIG. 2.

The SoC 100 may control the operation of at least one of the elements 910 through 980. The power source 910 may supply an operating voltage to at least one of the elements 910 through 980. The power source 910 may be controlled by the PMIC 40 illustrated in FIG. 1.

The storage device 920 may be implemented by a hard disk drive (HDD) or a solid state drive (SSD).

The memory 930 may be implemented by a volatile or non-volatile memory. The memory 930 may correspond to the memory device 140 illustrated in FIG. 1. A memory controller that controls a data access operation, e.g., a read operation, a write operation (or a program operation), or an erase operation, on the memory 930 may be integrated into or embedded in the SoC 100. Alternatively, the memory controller may be provided between the SoC 100 and the memory 930.

The I/O ports 940 are ports that receive data transmitted to the electronic system 900 or transmit data from the electronic system 900 to an external device. For instance, the I/O ports 940 may include a port connecting with a pointing device such as a computer mouse, a port connecting with a printer, and a port connecting with a USB drive.

The expansion card 950 may be implemented as a secure digital (SD) card or a multimedia card (MMC). The expansion card 950 may be a subscriber identity module (SIM) card or a universal SIM (USIM) card.

The network device 960 enables the electronic system 900 to be connected with a wired or wireless network. The display 970 displays data output from the storage device 920, the memory 930, the I/O ports 940, the expansion card 950, or the network device 960.

The camera module 980 converts optical images into electrical images. Accordingly, the electrical images output from the camera module 980 may be stored in the storage device 920, the memory 930, or the expansion card 950. Also, the electrical images output from the camera module 980 may be displayed through a display 970.

As described above, according to some exemplary embodiments, a sensed temperature is calibrated according to temperature, so that the accuracy of sensing temperature is increased. In addition, an error in a slope with respect to temperature is corrected using a temperature sensed at a particular temperature, so that the accuracy of sensing temperature at high temperature is increased and time and cost for tests or the like for the correction is reduced.

While exemplary embodiments have been particularly shown and described, it will be understood by those of ordinary skill in the art that various changes in forms and details may be made therein without departing from the spirit and scope of the inventive concept as defined by the following claims.

What is claimed is:

1. A temperature sensor comprising:
    a reference circuit configured to generate at least one temperature information signal that varies according to a temperature, and generate at least one reference signal that is substantially constant relative to the temperature; and
    a digital temperature generator configured to receive the at least one temperature information signal and the at least one reference signal generated by the reference circuit, and generate a digital temperature information signal indicative of the temperature based on the at least one temperature information signal and the at least one reference signal,
    wherein one of the reference circuit and the digital temperature generator is configured to receive a calibration signal and adjust the at least one reference signal based on the calibration signal, and
    wherein the reference circuit comprises a bandgap reference circuit which is configured to generate the at least one reference signal.

2. The temperature sensor of claim 1, wherein the digital temperature generator is configured to generate the digital temperature information signal based on a ratio of the at least one temperature information signal to the at least one reference signal.

3. The temperature sensor of claim 1, wherein the digital temperature generator is configured to convert the at least one temperature information signal into at least one digital temperature code, convert the at least one reference signal into at least one digital reference code, and generate the digital temperature information signal based on the at least one digital temperature code and the at least one digital reference code.

4. The temperature sensor of claim 1, wherein the reference circuit configured to receive the calibration signal, and
    the bandgap reference circuit comprises a variable output load to which the calibration signal is applied to adjust the at least one reference signal.

5. The temperature sensor of claim 1, wherein the digital temperature generator is configured to receive the calibration signal and adjust the at least one reference signal based on the calibration signal.

6. The temperature sensor of claim 1, wherein the reference circuit is configured to generate a first temperature information signal and a second temperature information signal that vary according to the temperature, and a first reference signal and a second reference signal that are substantially constant relative to the temperature,
    the digital temperature generator is configured to receive the first temperature information signal, the second temperature information signal, the first reference signal and the second reference signal generated by the reference circuit, and generate the digital temperature information signal indicative of the temperature based on the first temperature information signal, the second temperature information signal, the first reference signal and the second reference signal,
    wherein one of the reference circuit and the digital temperature generator is configured to receive the calibration signal and adjust at least one the first reference signal and the second reference signal based on the calibration signal, and
    wherein the bandgap reference circuit is configured to generate the first reference signal and the second reference signal.

7. The temperature sensor of claim 6, wherein the digital temperature generator is configured to generate the digital temperature information signal based on a ratio of the first temperature information signal and the second temperature information signal to the first reference signal and the second reference signal.

8. The temperature sensor of claim 7, wherein the ratio is of a first difference of the first temperature information signal and the second temperature information signal to a second difference of the first reference signal and the second reference signal.

9. The temperature sensor of claim 6, wherein a first voltage level of the first reference signal is different from a second voltage level of the second reference signal, and a third voltage level of one of the first temperature information signal and the second temperature information signal varies more with the temperature than a fourth voltage level of the other one of the first temperature information signal and the second temperature information signal.

10. The temperature sensor of claim 6, wherein the reference circuit is configured to receive the calibration signal, and
    the bandgap reference circuit comprises a variable output load to which the calibration signal is applied to adjust at least one of the first reference signal and the second reference signal.

11. The temperature sensor of claim 6, wherein the digital temperature generator comprises:
    a converter configured to receive the first temperature information signal, the second temperature information signal, the first reference signal and the second reference signal, convert the first temperature information signal and the second temperature information signal into a first digital temperature code and a second digital temperature code, respectively, and convert the first reference signal and the second reference signal into a first digital reference code and a second digital reference code, respectively; and an arithmetic unit configured to receive the first digital temperature code, the second digital temperature code, the first digital reference code and the second digital reference code output by the converter, and generate the digital temperature information signal based on the first digital temperature code, the second digital temperature code, the first digital reference code and the second digital reference code.

12. The temperature sensor of claim 11, wherein the digital temperature generator further comprises a selector configured to receive the first temperature information signal, the second temperature information signal, the first reference signal and the second reference signal, and sequentially output the first temperature information signal, the second temperature information signal, the first reference signal and the second reference signal to the converter.

13. The temperature sensor of claim 11, wherein the converter comprises:
   a voltage-controlled oscillator configured to receive as an input signal the first temperature information signal, the second temperature information signal, the first reference signal and the second reference signal, and output an oscillation signal having a frequency which varies with a level of the input signal;
   a counter circuit configured to count the oscillation signal using a reference clock signal and output a count value; and
   a register that is configured to store the count value output from the counter circuit and generate the first digital temperature code, the second digital temperature code, the first digital reference code and the second digital reference code based on the count value that is stored.

14. The temperature sensor of claim 11, wherein the arithmetic unit is configured to receive the calibration signal and adjust at least one of the first digital reference code and the second digital reference code based on the calibration signal.

15. The temperature sensor of claim 1, wherein the calibration signal is set based on tests or simulations of the temperature sensor.

16. A system on chip comprising:
a processor; and
a temperature sensor disposed inside or outside the processor, the temperature sensor comprising:
   a reference circuit configured to generate a first temperature information signal and a second temperature information signal that vary according to a temperature, and generate a first reference signal and a second reference signal that are substantially constant relative to the temperature; and
   a digital temperature generator configured to receive the first temperature information signal, the second temperature information signal, the first reference signal and the second reference signal generated by the reference circuit, and generate a digital temperature information signal indicative of the temperature based on the first temperature information signal, the second temperature information signal, the first reference signal and the second reference signal,
   wherein one of the reference circuit and the digital temperature generator is configured to receive a calibration signal and adjust at least one of the first reference signal and the second reference signal based on the calibration signal, and
   wherein the reference circuit comprises a bandgap reference circuit which is configured to generate the first reference signal and the second reference signal.

17. The system on chip of claim 16, further comprising:
a memory configured to store data and programs;
a memory controller configured to interface with and control an external memory;
a display controller configured to control operations of a display device; and
a graphics processing unit configured to process the data stored in the memory or execute one or more of the programs stored in the memory;
wherein the processor is a central processing unit configured to process the data stored in the memory or execute one or more of the programs stored in the memory.

18. An electronic system comprising:
a power source configured to supply an operating voltage;
a storage device;
a memory;
input/output ports;
a network device configured to communicably connect with a wired or wireless network;
a display configured to display data output from at least one of the storage device, the memory, the input/output ports, and the network device; and
a system on chip comprising a processor and a temperature sensor disposed inside or outside the processor, the temperature sensor comprising:
   a reference circuit configured to generate a first temperature information signal and a second temperature information signal that vary according to a temperature, and generate a first reference signal and a second reference signal that are substantially constant relative to the temperature; and
   a digital temperature generator configured to receive the first temperature information signal and the second temperature information signal and the first reference signal and the second reference signal generated by the reference circuit, and generate a digital temperature information signal indicative of the temperature based on the first temperature information signal, the second temperature information signal, the first reference signal and the second reference signal,
   wherein one of the reference circuit and the digital temperature generator is configured to receive a calibration signal and adjust at least one of the first reference signal and the second reference signal based on the calibration signal, and
   wherein the reference circuit comprises a bandgap reference circuit which is configured to generate the first reference signal and the second reference signal.

* * * * *